Oct. 14, 1969 K. SCHLÜTER 3,473,113

APPARATUS FOR MEASURING THE PHASE DISTORTIONS OF A TWO-TERMINAL NETWORK INCLUDING DIFFERENTIATION AND INTEGRATION MEANS

Filed May 13, 1966 2 Sheets-Sheet 1

INVENTOR
KLAUS SCHLÜTER

BY Stiee & Stiee
ATTORNEYS

Oct. 14, 1969 K. SCHLÜTER 3,473,113

APPARATUS FOR MEASURING THE PHASE DISTORTIONS OF A TWO-TERMINAL NETWORK INCLUDING DIFFERENTIATION AND INTEGRATION MEANS

Filed May 13, 1966 2 Sheets-Sheet 2

INVENTOR
KLAUS SCHLÜTER

United States Patent Office 3,473,113

Patented Oct. 14, 1969

3,473,113

APPARATUS FOR MEASURING THE PHASE DISTORTIONS OF A TWO-TERMINAL NETWORK INCLUDING DIFFERENTIATION AND INTEGRATION MEANS

Klaus Schlüter, Munich, Germany, assignor to Siemens Aktiengesellschaft, Munich, Germany, a corporation of Germany Filed May 13, 1966, Ser. No. 550,008
Claims priority, application Germany, May 17, 1965, S 97,136
Int. Cl. G01r *27/28*
U.S. Cl. 324—57 5 Claims

ABSTRACT OF THE DISCLOSURE

A circuit arrangement for measuring the phase distortions of a network by means which integrate test voltages representing the phase distortions of the network with respect to frequency as well as with respect to time. At a transmitting station a test signal is produced by mixing an amplitude modulated carrier with a frequency modulated signal and then filtering the mixed signals with a low pass filter to provide an amplitude modulated carrier which with respect to the original amplitude modulated carrier is shifted toward the lower frequencies by a set amount of an intermediate frequency of the frequency modulation minus the original carrier frequency. At the receiving station the original amplitude modulated carrier is received and compared with a similar locally generated signal in a phase discriminator. A frequency discriminator also provides a signal whose amplitude is dependent upon the momentary value of the carrier of the test signal. The output of the frequency discriminator is differentiated to provide a voltage proportional to the time derivation of the transmitted carrier frequency which is multiplied with the output of the phase discriminator to provide a signal dependent on group delay and differentiation of frequency with respect to time. This last-mentioned output is then integrated with respect to frequency and applied to the deflection system of a cathode beam tube along with the frequency derived output of the frequency discriminator to provide a graphical display of phase distortion of the network between the transmitting and receiving stations.

For the compensation of the signal distortions of a telecommunication signal transmitted over a two-terminal-pair network (two-port), especially a transmission system, in many cases the knowledge of the phase distortions of the two-port is of essential importance. In this case a simple tolerance limit can be defined which must not be exceeded by the phase distortions, and below which the signal distortions are not objectionable. If, for example, the phase distortions amount to not more than 6°, and assuming that no attenuation distortions are present, the signal distortions will be less than 5% of the signal amplitude. Such a tolerance limit cannot be set for group delay distortions of the two port network, since there is also involved, in addition to the amplitude of the group delay distortions, the frequency of the fluctuations within the transmission range.

For the determination of the phase distortions especially valuable in testing technology, a process has become known which proceeds from a conventional group delay modulation measurement. The group delay measuring test voltage here obtained which, with its time amplitude course represents a measure for the group delay curve occurring in the modulation frequency range and, for example, may be utilized for the representation of the same in a recording or viewing apparatus, is subjected to a subsequent integration with respect to the time, in which the integrated voltage then represents in its time course a value for the phase curve of the two part network in the modulated frequency range. It must be here taken into consideration that in the determination of the group delay a frequency dependent summand remains undetermined, which corresponds to a so-called basic delay. The phase value to be comprehended as an integration result, of the two port network contains, accordingly, an undetermined, frequency-proportional basic component (reference phase), which is dependent on the magnitude of this summand or of the basic delay. For the group delay test voltage, the summand mentioned represents a constant direct current component, while the reference phase in the integrated voltage depicting the phase curve corresponds to a time-proportional direct current component, which subsequently defines in the phase curve representation a phase reference comprising a straight line. If the direct current component of the group delay test voltage is so selected that there is derived for the basic delay a test voltage of zero, i.e., if there is measured merely the group delay distortion defined as the difference of the group delay and the basic delay, there will then be evaluated in the integration result the phase distortion defined as the difference of the phase magnitude and the reference phase.

Figure 1:
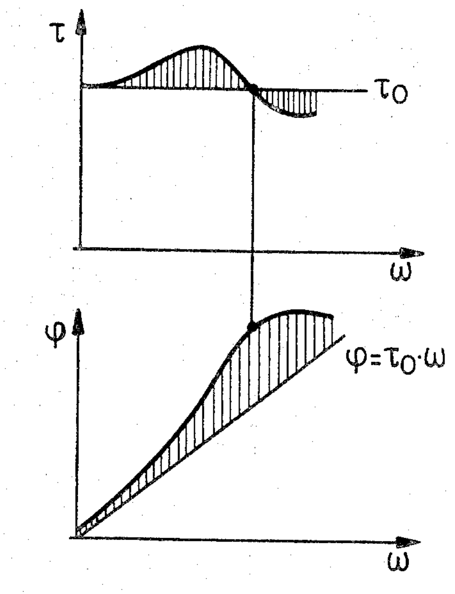
FIG. 1 is a diagram illustrating group delay distortions and the corresponding phase curve.
Figure 2:
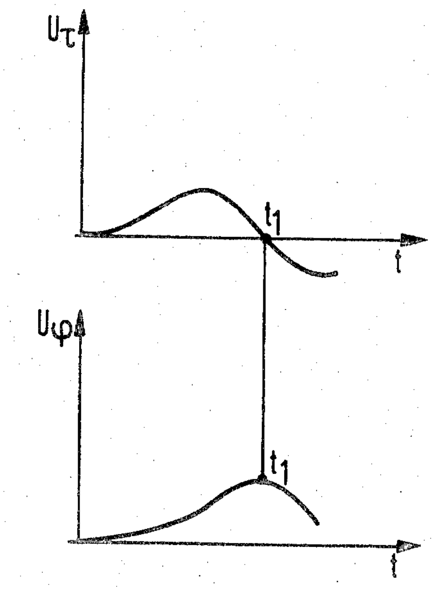
FIG. 2 illustrates corresponding measuring and phase distortion voltages.

Referring to FIG. 1, there is initially illustrated the group delay curve $\tau$ of a two port network with respect to the circuit frequency $\omega$, the basic delay being represented by a horizontal straight line, whose distance from the $\omega$-axis can be arbitrarily established. The hatched surface portions then represent the group delay distortions of the network with respect to the basic delay time. The phase curve $\varphi$ is plotted in the lower diagram relative to the frequency $\omega$. The undetermined, frequency-proportional component (reference phase) is here plotted as a phase reference straight line $\varphi=\tau_0\cdot\omega$. In this diagram the hatched area likewise represents the actual phase distortions with respect to the reference phase. If the direct current component of the group delay test voltage is so adjusted that for the basic delay $\tau_0$, appearing in FIG. 1, there results the test voltage zero, there then is obtained the group delay test voltage $U_\tau$ illustrated in FIG. 2, which at the point $t_1$ changes its sign, while the voltage $$|U_\varphi|$$

representing the phase distortions, and resulting therefrom by integration, has at time point $t_1$ a maximal value in the curve under consideration.

The difficulties of this process, proceeding from a group delay modulation measurement, lie in that the electrical integration of the group delay test voltage is an integration relative to time, while, according to definition, the transition from the group delay curve to the phase curve makes necessary an integration relative to the frequency. This can be derived, for example, from the relation:

$$\varphi=\int\tau\, d\omega \qquad (1)$$

in which $\varphi$ represents the phase magnitude, $\tau$ the group delay and $\omega$ the circuit frequency. Only when time of the curve of the phase distortions represented in a recording or viewing device. This scale is entirely independent of the magnitude or the time course of the modulation rate.

Further features and advantages of the invention will be explained in detail with the aid of the following description of the circuit arrangement, illustrated in FIG. 3, for the practice of the method.

Figure 3:
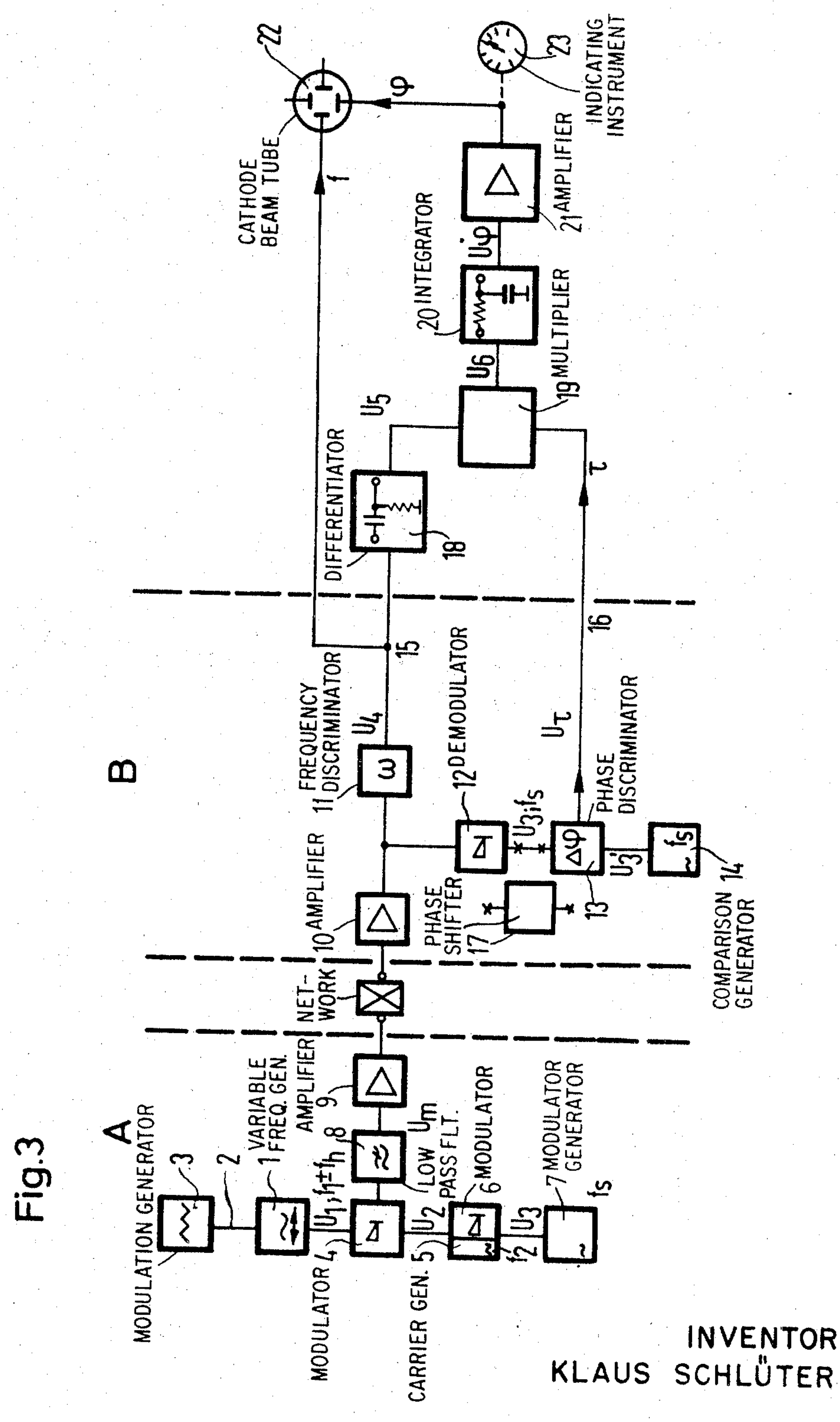
FIG. 3 is a circuit diagram of an apparatus for practicing the invention.

FIG. 3 illustrates a test arrangement which contains, as a first component, a partial circuit, known per se, for the determination of group delay distortions of a network according to the wobble method. A transmitting part A of this partial circuit contains a variable frequency generator 1, which includes voltage-controlled, frequency-determining means (reactance tube, capacitance diode or the like) and which is automatically frequency-modulated in its output frequency over a settable frequency range in dependence on the amplitude of the modulation voltage of the generator 3, connected to the generator 1 over the line 2. The output voltage $U_1$, varied in the range $f_1$–$f_h$, is mixed in a modulator 4 with a carrier oscillation $U_2$, having the frequency $f_2$, which is amplitude-modulated with a low, constant modulation frequency $f_s$ (split frequency). The carrier with the frequency $f_2$ is generated by a generator 5 and modulated in a modulator 6 with the voltage $U_3$ of the frequency $f_s$, supplied by a generator 7. At the output of modulator 6 there then appears the amplitude-modulated carrier oscillation $U_2$ to be supplied to the modulator 4.

By means of a low pass filter 8 connected at the output side of modulator 4, there is then filtered out a test voltage $U_m$, which consists of an amplitude modulated carrier oscillation, which, with respect to $U_2$, is shifted in the direction of lower frequencies by the fixed amount $f_1$–$f_2$. The test voltage $U_m$ is supplied over an amplifier 9 to the object X to be measured and from the output of the latter is conducted to an amplifier 10, which represents the input stage of a receiver part B of the partial circuit initially referred to.

The output voltage of amplifier 10 is supplied to a frequency discriminator 11, which generates a voltage $U_4$ whose amplitude depends on the momentary value of the carrier frequency of the test voltage $U_m$, and also to a demodulator 12 which recovers from the test voltage the modulation voltage $U_3$ with the frequence $f_s$. This modulation voltage $U_3$ is compared in a phase discriminator 13 with an output voltage $U_3'$, of like type and frequency, which is produced by a comparison generator 14, with respect to the reciprocal phase position. An output voltage $U_\tau$ formed in the phase discriminator 13, as a comparison result, then provides by its amplitude a measure for the phase difference of voltages $U_3$ and $U_3'$, and thereby simultaneously a measure for the group delay distortion of the network X, which likewise is dependent on the carrier frequency of the test voltage. It is then possible, in a manner known per se, to conduct the voltages $U_4$ and $U_\tau$ occurring at terminals 15 and 16 to the horizontal and vertical deflection system of a cathode beam oscillograph, on which picture screen there is then depicted a curve representation of the delay distortion in the network X in the modulated frequency range of the test voltage $U_m$.

The partial circuit thus far described can be modified at individual points in various manners known to those skilled in the art. Thus, the illustrated details pertaining to the generation of the test voltage $U_m$ forms no part of the present invention. Likewise, in the event that the transmitter portion A and the receiver portion B are not separated from one another, the output voltage $U_4$ at terminal 15 can also be directly derived from the output voltage of the voltage generator 3. Lastly, the entire partial circuit described above for the determination of the group delay distortions in the modulation operation is not per se essential to the invention, but can be replaced, for example, by any other know circuit arrangement for the determination of the group delay distortions which produces at the output terminals corresponding to 15 and 16, comparable voltages $U_4$ and $U_\tau$.

In this context it is additionally pointed out that in general in the known systems the test voltage $U_\tau$ is generated with an adjustable direct current component, which serves to displace the group delay distortion curve on the screen of a cathode beam oscillograph, connected in the manner described at the terminals 15, 16, in a vertical direction with respect to a horizontal reference straight line on the picture screen. Through such an adjustment the basic delay may be set at arbitrary values and, in particular, through this adjustment, allocated to certain frequencies within the frequency test range. A change of the direct current component of voltage $U_\tau$ can take place in a testing system of the type described in FIG. 3, for example, through adjustment of a phase shifter 17 connected at the input side of phase discriminator 13, whereby the working point on the $\Delta\varphi/U_\tau$ characteristic curve of and the testing frequencies are linearly related does the electrical integration, which is made, for example, by means of an RC member on the basis of a suitable scale, yield correct measuring results for the phase distortions. The scale, however, then depends on the particular modulation rate employed. In a spatial separation of modulation transmitter and receiver this is generlly not directly readable, so that the right scale cannot in this case be provided. Moreover, in the case of a non-linear relation between time and testing frequency, there is no fixed scale whatever present for the phase distortions.

In a process for the determination of the phase distortions of a network, especially a transmission system, in which the testing frequency, ascertained by a group delay modulation measuring process and representing a measure of the group delay distortions, is subjected to a subsequent integration over the time with the integrated voltage representing a measure for the phase distortions, the above mentioned difficulties are avoided by the method according to the invention in which the test voltage representing a measure of the group delay is multiplied, prior to the integration, with another voltage which is formed by differentiation with a direct current proportional to the testing frequency.

An essential advantage of the method according to the invention lies in the fact that there can be allocated to the integrated voltage, representing a measure for the curve of the phase distortions of the network in the modulated frequency range, a clear, definite amplitude scale, which permits a direct evaluation of the voltage in an indicating device or also, in particular an evaluation discriminator 13 is altered ($\Delta\varphi$=phase difference between $U_3$ and $U_3'$).

According to the invention there is connected to terminal 15 differentiation a stage 18, known per se, which consists, for example, of an RC member, indicatd schematically in FIG. 3. If the voltage lying on terminal 15, porportional to the test frequency, is designated $$U_4(\omega)=K_1\cdot\omega \quad (2)$$

there then arises at the output of the differentiating stage 18 a voltage $$U_5(\omega)=K_1\cdot K_2\cdot\frac{d\omega}{dt} \quad (3)$$

a voltage, therefore, which is proportional to the time derivation of the frequency. The voltage $U_5$, together with the voltage $U_\tau$ appearing at the terminal 16, is supplied to the two inputs of a multiplier 19 which forms an output voltage $U_6$ dependent on the group delay and on the derivation of the frequency with respect to time:

$$U_6(\tau,\omega)=K_1\cdot K_2\cdot K_3\cdot U\cdot\frac{d\omega}{dt} \quad (4)$$

A following integrating stage 20, which consists, for example, of an RC member schematically represented in FIG. 3, integrates the voltage $U_6$ with respect to time and yields a voltage $U_\phi$ which is proportional to the phase distortion $\varphi$ of the network X.

$$U_\varphi=K_4\cdot\int U_6(\tau,\omega)dt=K_1\cdot K_2\cdot K_3\cdot K_4\cdot\int U_\tau\cdot d\omega \quad (5)$$

The constants $K_1$ to $K_4$ are pure apparatus constants and thus independent of the test frequency or the magnitude and the time course of the modulation rate. The voltage $$|U_\varphi|$$

which is proportional to the phase distortion $\varphi$, is preferably conducted over an amplifier 21, whose amplification is so adjusted that the numerical evaluation of the test voltage $$|U_\varphi|$$

can take place on a fixed scale of the cathode beam tube 22 serving as registering or viewing device. The horizontal deflection of the electron beam is here effected by means of the voltage $U_4$ proportional to the test frequency. Besides the described evaluation by means of the cathode beam oscillograph 22, a numerical evaluation can also be made on an indicating instrument 23 (indicator instrument, light indicator instrument or the like), which, for example, makes possible a monitoring of prescribed distortion tolerances.

In effecting the phase distortion measurement of a network X as an interval measurement, the use in the method of the invention of a frequency discriminator 11 for the derivation of the voltage $U_4$ proportional to the test frequency, leads to a direct numerical evaluation with the aid of a clear definite scale, without the necessity of a synchronization line between the transmitting portion A and the receiving portion B. If there is involved, in the case of the network X, a transmission system which provides a message transmission with the utilization of a carrier, on which the message voltage is modulated according to any process, it is expedient to allocate zero phase distortion to the carrier frequency. Thereby in the diagrams according to FIG. 1 the origin of the coordinate system corresponds in each case to the carrier frequency of the transmission system.

I claim:

1. A circuit arrangement for evaluating the phase distortion of an electrical network having an input and an output, said arrangement comprising group delay measuring apparatus including a frequency-modulated transmitter section for connection to said input and a receiver section for connection to said output, said receiver section including first means for providing a first voltage having an amplitude which is proportional to the frequency of a modulated test voltage produced by said transmitter section and received by said receiver section via said network, and second means for providing a second voltage having an amplitude which represents the momentary delay of said network as a function of the amplitude of the first voltage, a differentiating circuit operatively connected to said first means a multiplier operatively connected to said differentiating circuit and with said second means, an integrator operatively connected to said multiplier, means for indicating the phase distortion of said network, and circuit means operatively connecting said integrator with said indicating means.

2. An arrangement according to claim 1, wherein said phase distortion indicating means comprises a cathode-ray-oscilloscope, the vertical deflection circuit of which is operatively connected to the output of said integrator and the horizontal deflection circuit of which is operatively connected to said first means.

3. An arrangement according to claim 2, wherein said first means includes a frequency discriminator operative to produce said first voltage.

4. An arrangement according to claim 1, wherein said phase-distortion indicating means comprises an indicating instrument connected to and directly operable by the voltage output of said integrator.

5. An arrangement according to claim 4, wherein said first means includes a frequency discriminator operative to produce said first voltage.

References Cited

UNITED STATES PATENTS

| | | | |
|---|---|---|---|
| 2,767,373 | 10/1956 | Maggio | 324—57 |
| 3,293,547 | 12/1966 | Weissker | 324—57 |
| 3,328,686 | 6/1967 | Fuchs | 324—77 |

EDWARD E. KUBASIEWICZ, Primary Examiner

U.S. Cl. X.R.

324—83

PO-1050
(5/69)

UNITED STATES PATENT OFFICE
CERTIFICATE OF CORRECTION

Patent No. 3,473,113 Dated October 14, 1969

Inventor(s) Klaus Schlüter

It is certified that error appears in the above-identified patent and that said Letters Patent are hereby corrected as shown below:

COLUMN 1, line 70, "modulation" should read --modulated--;

COLUMN 2, line 3, "part" should read --port--, line 53,  should read 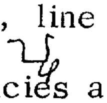 --, line 67, after "time" insert --and the testing frequencies are linearly related does the electrical integration, which is made, for example, by means of an RC member on the basis of a suitable scale, yield correct measuring results for the phase distortions. The scale, however, then depends on the particular modulation rate employed. In a spatial separation of modulation transmitter and receiver this is generally not directly readable, so that the right scale cannot in this case be provided. Moreover, in the case of a non-linear relation between time and testing frequency, there is no fixed scale whatever present for the phase distortions. (paragraph) In a process for the determination of the phase distortions of a network, especially a transmission system, in which the testing frequency, ascertained by a group delay modulation measuring process and representing a measure of the group delay distortions, is subjected to a subsequent integration over the time with the integrated voltage representing a measure for the phase distortions, the above mentioned difficulties are avoided by the method according to the invention in which the test voltage representing a measure of the group delay is multiplied, prior to the integration, with another voltage which is formed by differentiation with a direct current proportional to the testing frequency. (paragraph) An essential advantage of the method according to the invention lies in the fact that there can be allocated to the integrated voltage, representing a measure for the curve of the phase distortions of the network in the modulated frequency range, a clear, definite amplitude scale, which permits a direct evaluation of the voltage in an indicating device or also, in particular an evaluation --;

COLUMN 3, line 39, delete "frequence" and insert --frequency--;

COLUMN 4, lines 14-44, delete "and the testing ... and evaluation," line 49, "differentiation" should read --differentiating--, line 50, "indicatd" should read --indicated--, line 51, "porportional" should read --proportional--;

COLUMN 5, lines 4 and 10 $|U_\varphi|$ should read $U_\varphi$ --.

SIGNED AND
SEALED
JUN 2 1970

(SEAL)
Attest:

EDWARD M. FLETCHER, JR.
Attesting Officer

WILLIAM E. SCHUYLER, JR.
Commissioner of Patents